United States Patent
Baranowski et al.

(10) Patent No.: US 6,411,062 B1
(45) Date of Patent: Jun. 25, 2002

(54) QUICK RELEASE BATTERY AND CLIP FOR PORTABLE DEVICE AND METHOD OF IMPLEMENTING SAME

(75) Inventors: Robert Baranowski, San Diego; Roger William Berg, Carlsbad, both of CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/400,284

(22) Filed: Sep. 21, 1999

(51) Int. Cl.⁷ .................................................. H02J 7/00
(52) U.S. Cl. ......................................... 320/112; 307/66
(58) Field of Search ................................. 320/107, 112, 320/113, 114, 115; 307/66, 10.7; 361/814

(56) References Cited

U.S. PATENT DOCUMENTS

| | | |
|---|---|---|
| 5,136,229 A | 8/1992 | Galvin |
| 5,631,503 A * | 5/1997 | Cioffi ........................... 307/66 |
| 5,738,954 A | 4/1998 | Latella et al. |
| 5,768,371 A | 6/1998 | Snyder |
| 6,043,626 A * | 3/2000 | Synder et al. ............... 320/113 |
| 6,064,577 A * | 3/2000 | Moskowitz et al. ......... 361/814 |

FOREIGN PATENT DOCUMENTS

| | | |
|---|---|---|
| EP | 0 608 899 | 8/1994 |
| WO | 99/43094 | 8/1999 |
| WO | 00/07275 | 2/2000 |

\* cited by examiner

*Primary Examiner*—Gregory Toatley
(74) *Attorney, Agent, or Firm*—Rader, Fishman & Grauer PLLC; Ronald P. Kananen

(57) ABSTRACT

A personal electronic device, such as a wireless phone or personal digital assistant is separable from its primary battery when it is to be used. A smaller secondary battery within the device provides power during individual uses of the device. The secondary battery is recharged by the primary battery when the device is reconnected to the primary battery. Consequently, the device is lighter and less bulky when in use due to the absence of the primary battery unit. A belt clip is disposed on the primary battery unit so as to retain the primary battery unit on the user's belt or elsewhere when the device is separated.

The separable portion of the device is releasably latched to the primary battery unit so as to be secured in place when not in use.

42 Claims, 2 Drawing Sheets

QUICK RELEASE BATTERY AND CLIP FOR PORTABLE DEVICE AND METHOD OF IMPLEMENTING SAME

FIELD OF THE INVENTION

The present invention relates to the field of personal electronic devices such as wireless telephones and personal digital assistants. More particularly, the present invention relates to the fields of transporting and minimizing the size of such devices.

BACKGROUND OF THE INVENTION

Portable electronic devices such as wireless telephones, pagers, personal digital assistants (PDAs) and combinations thereof, continue to grow smaller while offering more features due to technological advances in electronic circuitry. The principle advantage of such devices is their portability. Operating on battery power, personal electronic devices can provide a host of services wherever the user happens to be. For example, the devices mentioned above can provide telephonic communication, text communication or basic computing power virtually whenever and wherever necessary.

This portability is obviously enhanced as the device becomes smaller and easier to carry or keep on the person of the user. To facilitate the transportation of personal electronic devices like those mentioned above, a variety of devices have been used. However, as the personal electronic devices themselves have advanced, the basic devices for carrying or wearing the devices have remained unchanged.

For example, some personal electronic devices are carried using a holster. The holster is generally a plastic, vinyl or leather case that attaches to the user's belt. When not in use, the electronic device is stored close at hand in the holster. The device can then readily be removed from the holster when needed while the holster stays attached to the user's belt.

Such holsters clearly fulfil their intended purpose, but have drawbacks. For example, the holster is necessarily larger than the personal electronic device it accommodates. This is particularly true if the device is easy to insert into and remove from the holster. Consequently, the size of the article attached to the user's belt is larger than necessary. Additionally, if the holster is secured on the user's belt by a belt loop or similar device, the holster cannot be removed without undoing the belt.

As an alternative, some personal electronic devices are carried in a carrying case that incorporates a belt clip. With such a carrying case, the personal electronic device is secured in the case by, for example, a zipper or Velcro-brand hook and loop fasteners. The carrying case may be designed with openings or windows designed to allow the user to access the display and control device, such as a keypad, of the personal electronic device without removing the carrying case.

Consequently, the personal electronic device is clipped on the user's belt with the belt clip of the carrying case. When needed, the user can remove the device from the carrying case, or remove the entire carrying case from his or her belt and use the personal electronic device with the carrying case secured thereon.

This arrangement has several disadvantages. For example, it may be awkward and time consuming to remove the device from the carrying case so as to leave the case clipped to the user's belt. If the device is used with the carrying case still attached, it becomes necessary to decide how tightly the clip should secure the case to the user's belt. If the clip secures the case tightly, it will be difficult to disengage when the need arises. Alternatively, if the clip secures the case too loosely, the carrying case and personal electronic device may be prone to falling off the user's belt and possibly being damaged.

A third alternative is to eliminate altogether any holster or carrying case and provide a belt clip as part of the personal electronic device itself. This allows the object secured to the user's belt to be no larger than necessary. But again, the question is raised as to how tightly the clip should secure the device to the user's belt with no satisfactory balance apparent between the competing concerns.

Consequently, there is a need in the art for an improved means of securing a personal electronic device on the person or personal effects of a user. More specifically, there is a need in the art for a means of better securing a personal electronic device on the person or personal effects of a user where the total package worn or carried by the user is no larger than necessary, is easily removed when needed and is not prone to falling off and being damaged.

SUMMARY OF THE INVENTION

It is an object of the present invention to meet the above-described needs and others. Specifically, it is an object of the present invention to provide an improved means of securing a personal electronic device on the person or personal effects of a user where the object worn or carried by the user is no larger than necessary, is easily removed when needed and is not prone to falling off and being damaged.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a personal electronic device having: a primary battery unit separable from the personal electronic device; a secondary battery unit in the personal electronic device for powering the personal electronic device when the primary battery unit is separated from the personal electronic device; and a clip on the primary battery unit for securing the primary battery unit and the personal electronic device, when connected to the primary battery unit, to the person or on a personal effect of the user.

A charger in the personal electronic device recharges the secondary battery unit with power from the primary battery unit. Preferably, an upconverter connected to the charger allows full charging of the secondary battery unit from the primary battery unit even if the primary battery unit is substantially depleted.

A recess in the personal electronic device may be provided for receiving the primary battery unit. Battery contacts within the recess electrically connect the primary battery unit with the personal electronic device, including the secondary battery unit.

A releasable latch is preferably used for physically latching the primary battery unit to the personal electronic device. To accommodate separation of the primary battery unit and the personal electronic device, the latch should be a quick-release latch that can be released with a single-stroke actuation of a release mechanism.

An external charger can be connected to the primary battery unit to recharge the primary battery unit. A switch selectively connects to the primary or secondary battery units, or to the external charger, to provide power for the personal electronic device.

The present invention also encompasses the method of using a personal electronic device implemented as described above by separating the personal electronic device from the primary battery unit when using the personal electronic device, the personal electronic device comprising the secondary battery unit for powering the personal electronic device when disconnected from the primary battery unit. The present invention also encompasses the method of transporting the personal electronic device described above by clipping the personal electronic device to a person or personal effect of a user with a clip provided on the separable primary battery unit of the personal electronic device.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Stated in broad principle, the present invention provides a personal electronic device that is quickly separable from its—far primary battery when the user wishes to operate the device. A smaller secondary battery within the personal electronic device provides power on a short-term basis while the device is in use. In this way, the bulk and weight of the device are reduced when the device is separated from the primary battery and in use.

Additionally, a clip for clipping the device somewhere on the person or to a personal effect of the user is disposed on the primary battery. In this way, the clip can be made relatively strong so as to readily retain the personal electronic device in position on the user's person or effects without being prone to allowing the device to drop and potentially be damaged.

Figure 1:
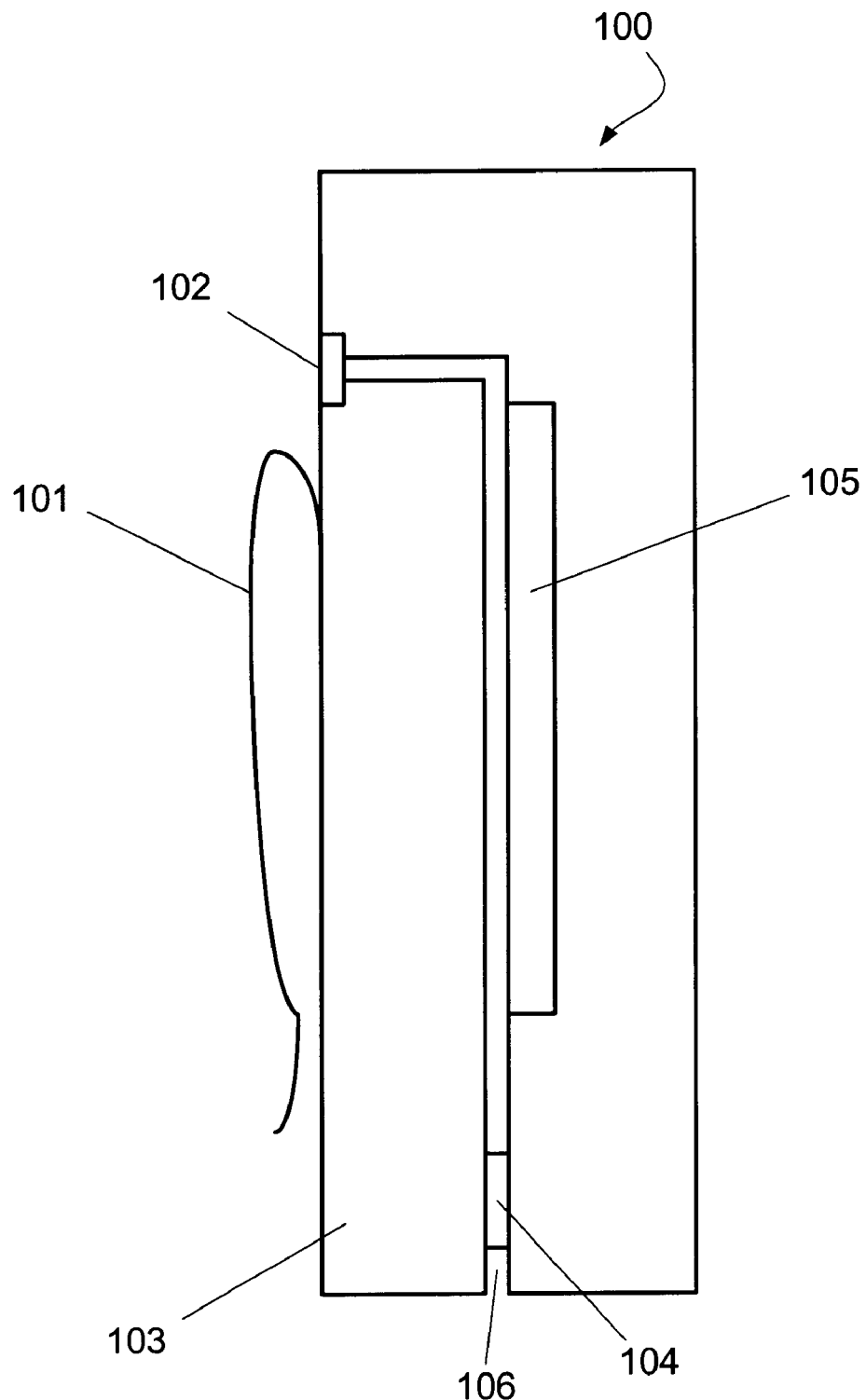
FIG. 1 is an illustration of a personal electronic device and means of transporting the same according to the present invention.

Using the drawings, the preferred embodiments of the present invention will now be explained. FIG. 1 illustrates a personal electronic device (100) according to the present invention. The personal electronic device (100) of the present invention can be virtually any personal electronic device, for example, but not limited to, a wireless phone, a pager, a personal digital assistant, a mini-disc or compact disc player, a cassette tape player or any combination thereof.

The personal electronic device (100) includes a recess (106) or port in which a primary battery (103) is disposed. The recess (106) for the primary battery (103) in the device (100) may correspond precisely to the size and shape of the battery (103) and may or may not provide side walls which partially enclose the battery (103) when the device (100) is connected thereto.

A latch (102) is provided to lock the device (100) to the primary battery (103). The latch (102) may be implemented in a wide variety of ways, all of which are within the scope of the present invention. The principal purpose of the latch (102), when engaged, is to prevent the device (100) from separating from the primary battery (103). The latch (102) should also be a quick-release latch incorporating a button, lever or other device for easily releasing the latch mechanism so that the device (100) can be separated from the battery (103). The mechanism for releasing the latch should require only a single stroke actuation. Preferably, the latch (102) can sufficiently secure the battery (103) and device (100) so that not even a moderate impact to the unit will prematurely disengage the latch (102).

A belt clip (101) is also provided on the primary battery (103). This clip (101) is used to clip the primary battery (103) and the personal electronic device (100), when attached to the primary battery (103), to the person or personal effects of a user. The clip (101) may be used to attach the unit to a user's belt, waistband, pocket, lapel, collar, suspenders, etc. The clip (101) may also be used to attach the unit to a personal effect of the user such as a purse, briefcase, piece of luggage, planner, book, binder or other item carried or worn by the user.

The clip (101) can be made relatively strong so as to tightly secure the unit (100) and prevent it from inadvertently falling or dropping. When the device (100) is to be used, it is disconnected from the primary battery (103) by releasing the latch (102). Consequently, the clip (101) is not disengaged at each use of the device (100). Therefore, the clip (101) can be made stronger than would be the case if it had to be repeatedly disengaged each time the device (100) is used. In this way, the device (100) is both easy to access when needed via the latch (102) and yet securely attached otherwise.

In order to provide power to the personal electronic device (100) when not connected to the primary battery (103), a secondary battery (105) is provided in the separable portion (212) of the personal electronic device (100). When separated from the primary battery (103) for use, the personal electronic device (100) is lighter and less bulky than would be the case if the primary battery (103) were retained in the device (100).

The secondary battery (105) is preferably smaller than the primary battery (103). Due to its smaller size, the secondary battery (105) will only be able to supply power to the personal electronic device (100) for a shorter period of time than the primary battery (103). However, this shorter period may be more than sufficient to accommodate most any single use of the personal electronic device (100).

Whenever the personal electronic device (100) is reattached to the primary battery (103), the secondary battery (105) draws power and is recharged, preferably fully recharged, by the primary battery (103). The recess (106) in which the primary battery (103) is accommodated includes contacts (104) for electrically connecting the personal electronic device (100), including the secondary battery (105), with the primary battery (103). The relative sizes of the primary (103) and secondary (105) batteries will depend on the power requirements of the personal electronic device (100).

In the event that the secondary battery (105) is insufficient to power the personal electronic device (100) throughout any particular use, the personal electronic device (100) may provide the user with a warning that the power from the secondary battery (105) is about to fail. The user can then disengage the clip (101), remount the personal electronic device (100) to the primary battery (103) and have additional power directly from the primary battery (103) as needed. The alert that the secondary battery (105) is depleted may be, for example, a visual alert displayed on a display device of the personal electronic device (100) or may be an audible alert produced by a speaker on the personal electronic device (100).

Figure 2:
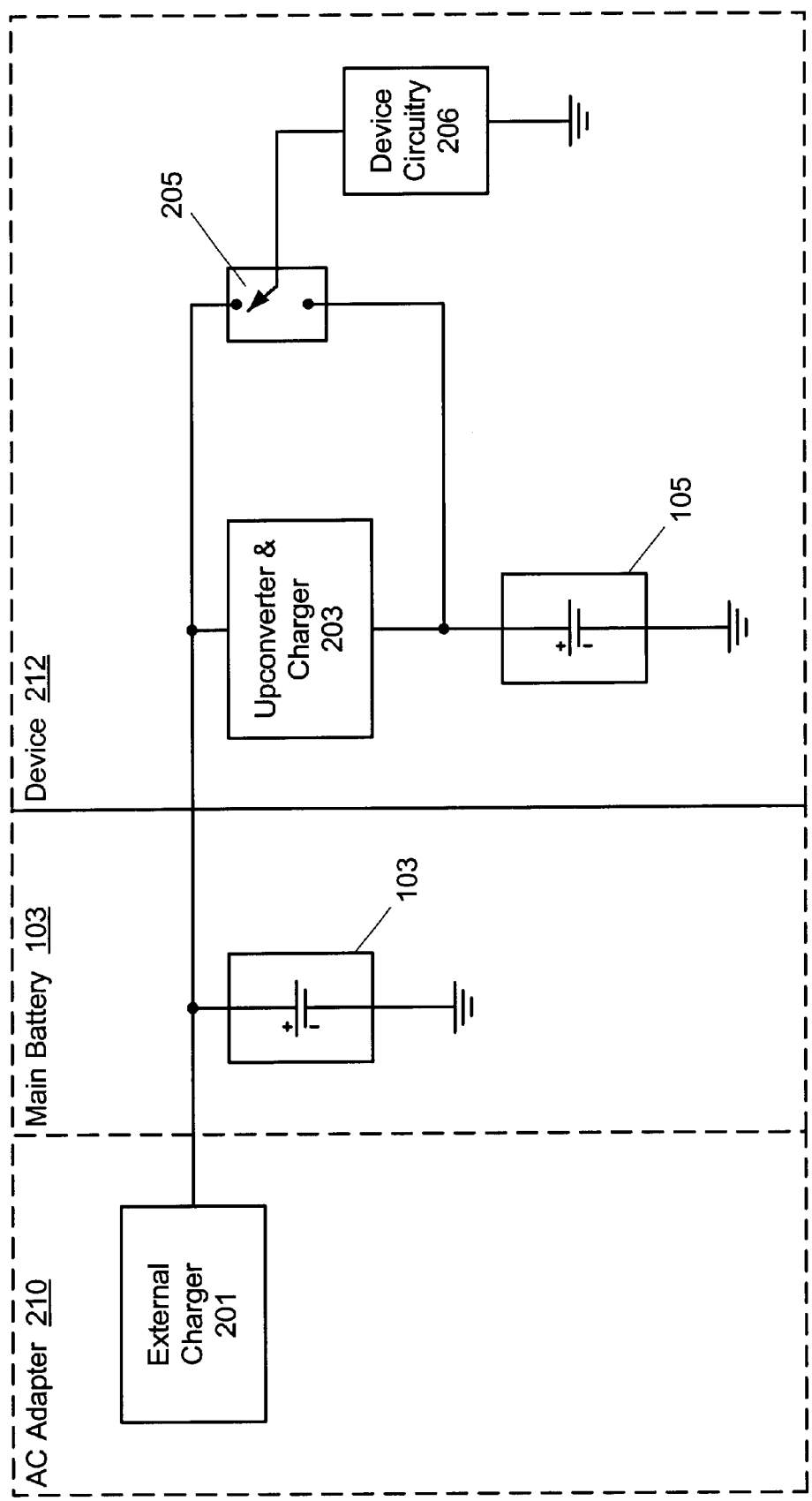
FIG. 2 is a block diagram of the circuitry for the device and transportation system of FIG. 1 according to the present invention.

FIG. 2 provides a block diagram of the electrical schematic of the present invention. The primary or main battery unit (103) includes a connection for an external charger (201) that can be used to recharge the primary battery (103). The external charger (201) is preferably an AC adapter (210) for connection to an electrical wall outlet. Alternatively, the external charger (201) may be connected to, for example, the cigarette lighter in an automobile.

Through the contacts (104) in the recess (106), the primary battery (103) is also connected to the circuitry in the separable portion (212) of the personal electronic device (100). Specifically, the input from the primary battery (103) is provided to an upconverter and charger (203). The upconverter and charger (203) uses the power from the primary battery (103) to recharge the secondary battery (105). By using an upconverter (203), the secondary battery (105) can be fully charged even if the primary battery (103) is nearing depletion.

A switch (205) alternately connects the actual operating circuitry (206) of the personal electronic device (100) with either the primary (103) or secondary (105) battery. Whenever the device (212) is disconnected from the primary battery (103), the switch (205) will maintain a connection between the secondary battery (105) and the circuitry (206). When the primary battery (103) is connected to the device (212), however, the switch (205) responds to the connection of the primary battery (103) and switches to provide power to the circuitry (206) from the primary battery (103).

Power from the primary battery (103) is also preferably provided to the upconverter and charger (203) regardless of the position of the switch (205) so as to recharge, if necessary, the secondary battery (105). If the primary battery (103) becomes depleted, the switch (205) will respond by connecting the device circuitry (206) to the secondary battery (105) to maintain power to the circuitry (206) as long as possible.

If the external charger (201) is connected and available as a power source, the switch (205), as shown in FIG. 2, will be in the upper position so as to provide power directly from the external charger (201) to the circuitry (206). The primary battery (103) and the secondary battery (103), through the upconverter and charger (203), may also draw power from the external charger (201) at the same time.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A personal electronic device comprising:
   a primary battery unit separable from said personal electronic device;
   a secondary battery unit in said personal electronic device for powering said personal electronic device when said primary battery unit is separated therefrom;
   a charger for charging said secondary battery unit with power from said primary battery unit;
   a clip on said primary battery unit for securing in place said primary battery unit and said personal electronic device, when connected to said primary battery unit;
   a recess in said personal electronic device for receiving said primary battery unit; and
   contacts within said recess for electrically connecting said primary battery unit with said personal electronic device, including said secondary battery unit.

2. The device of claim 1, further comprising a releasable latch for physically latching said primary battery unit to said personal electronic device.

3. The device of claim 2, wherein said latch is a quick-release latch that can be released with a one-stroke actuation of a release mechanism.

4. The device of claim 1, further comprising an external charger for connection to said primary battery unit to recharge said primary battery unit.

5. The device of claim 1, further comprising a switch for selectively connecting to said primary and secondary battery units to provide power for said personal electronic device.

6. A personal electronic device comprising:
   a device enclosure, said device enclosure having a recess;
   a primary battery unit, said primary battery unit being structurally adapted for placement within said recess; and
   a clip, said clip being attached to said primary battery unit.

7. The device of claim 6, further comprising:
   an external charger.

8. The device of claim 7, wherein said external charger is capable of being a power source to said personal electronic device.

9. The device of claim 7, wherein said external charger is capable of recharging said primary battery unit.

10. The device of claim 6, wherein said primary battery unit is attached to said personal electronic device.

11. The device of claim 6, wherein said primary battery unit is releasably attached to said personal electronic device.

12. The device of claim 6, wherein said primary battery unit is located with said recess.

13. The device of claim 12, further comprising:
    a secondary battery unit, said secondary battery unit being situated between said device enclosure and said primary battery unit.

14. The device of claim 6, further comprising:
    a secondary battery unit.

15. The device of claim 14, wherein said secondary battery unit is recharged by said primary battery unit.

16. The device of claim 14, further comprising:
    an upconverter/charger located within said device enclosure, said upconverter/charger recharging said secondary battery unit.

17. The device of claim 16, wherein said upconverter/charger uses said primary battery unit as a power source to recharge said secondary battery unit.

18. The device of claim 16, wherein said upconverter/charger uses an external charger as a power source to recharge said secondary battery unit.

19. The device of claim 14, wherein said secondary battery unit is located within said recess.

20. The device of claim 14, wherein said secondary battery unit is located within said device enclosure.

21. The device of claim 14, wherein said secondary battery unit draws power from said primary battery unit.

22. The device of claim 14, wherein said secondary battery unit is capable of providing power to said personal electronic device.

23. The device of claim 22, wherein said secondary battery unit provides power to said personal electronic device when said primary battery unit is separated from said personal electronic device.

24. The device of claim 22, further comprising:
device circuitry, said device circuitry being within said device enclosure; and
a switch, said switch connecting said secondary battery unit to said device circuitry when said primary battery unit is separated from said personal electronic device and connecting said primary battery unit to said device circuitry when said primary battery unit is attached to said personal electronic device.

25. The device of claim 6, further comprising:
a latch, said latch being structurally adapted to lock said primary battery unit to said personal electronic device.

26. The device of claim 6, further comprising:
at least one contact, said contact electrically connecting said primary battery unit to said personal electronic device and being located within said recess.

27. The device of claim 6, wherein said clip is structurally adapted to secure said primary battery unit to an object that is detached from said primary battery unit.

28. A personal electronic device comprising:
a device enclosure, said device enclosure having a recess;
device circuitry, said device circuitry being within said device enclosure;
a primary battery unit, said primary battery unit being structurally adapted for placement within said recess;
a clip, said clip being attached to said primary battery unit;
a secondary battery unit;
an upconverter/charger located within said device enclosure, said upconverter/charger recharging said secondary battery unit; and
a switch, said switch connecting said secondary battery unit to said device circuitry when said primary battery unit is separated from said personal electronic device and connecting said primary battery unit to said device circuitry when said primary battery unit is attached to said personal electronic device.

29. A method of using and powering a personal electronic device, said a personal electronic device including a device enclosure having a recess, device circuitry within said device enclosure; a primary battery unit structurally adapted for placement within said recess, a clip attached to said primary battery unit, and a secondary battery unit, said method comprising:
separating said primary battery unit from said recess to remove said primary battery unit from said personal electronic device; and
connecting said secondary battery unit to said device circuitry when said primary battery unit is separated from said personal electronic device.

30. The method of claim 29, further comprising:
connecting said primary battery unit to said device circuitry when said primary battery unit is attached to said personal electronic device.

31. The method of claim 29, further comprising:
using an external charger as a power source to said personal electronic device.

32. The method of claim 29, further comprising:
using an external charger to recharge said primary battery unit.

33. The method of claim 29, further comprising:
situating said secondary battery unit between said device enclosure and said primary battery unit.

34. The method of claim 29, further comprising:
using said primary battery unit to recharge said secondary battery unit.

35. The method of claim 29, further comprising:
using an upconverter/charger located within said device enclosure to recharge said secondary battery unit.

36. The method of claim 35, wherein said upconverter/charger uses said primary battery unit as a power source to recharge said secondary battery unit.

37. The method of claim 35, wherein said upconverter/charger uses an external charger as a power source to recharge said secondary battery unit.

38. The method of claim 29, wherein said secondary battery unit is located within said recess.

39. The method of claim 29, wherein said secondary battery unit is located within said device enclosure.

40. The method of claim 29, wherein said secondary battery unit draws power from said primary battery unit.

41. The method of claim 29, wherein said secondary battery unit provides power to said personal electronic device.

42. The method of claim 29, wherein said clip secures said primary battery unit to an object that is detached from said primary battery unit.

* * * * *